May 12, 1936.  D. V. EDWARDS  2,040,768

ELECTRICAL STANDARD

Filed Jan. 16, 1935

INVENTOR
Donald V. Edwards.
BY
Edwards, Bower & Pool.
ATTORNEYS

Patented May 12, 1936

2,040,768

UNITED STATES PATENT OFFICE 2,040,768

ELECTRICAL STANDARD

Donald V. Edwards, Montclair, N. J., assignor to Electrons, Incorporated of Delaware, a corporation of Delaware Application January 16, 1935, Serial No. 2,059

16 Claims. (Cl. 171—242)

This invention relates to electrical devices which serve as standards of comparison for electrical quantities, and more particularly to a standard and its associated apparatus by which an electrical quantity or value is maintained in definite predetermined relation to a value created by the standard.

Objects of the invention are to provide an unvarying standard of comparison for an electrical quantity and to regulate an electrical device or circuit in accordance therewith.

According to the invention a magnetic armature is placed in a permanent magnetic field and is saturated by a minor portion of the magnetic flux of said field. The armature is provided with means for creating a counter flux therein, such as a winding on the armature having an impressed voltage that varies with the electrical quantity to be compared or controlled. A separate winding on the armature has a voltage induced in it only when the counter flux is sufficient to reduce below saturation (or to reverse) that portion of the permanent flux which is in the armature. This induced voltage may be used to control a circuit or device capable of reducing the quantity to be controlled which is thereby prevented from increasing above a certain predetermined value or standard set by the permanent magnetic field.

Several embodiments of the invention have been selected for the following description which should be read in connection with the accompanying drawing in which,—

In the several figures like reference characters indicate corresponding parts.

Figure 1:
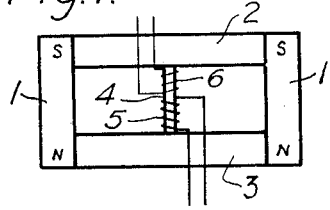
Fig. 1 represents an electrical standard according to the invention, the figure being partly diagrammatic.

Referring to Fig. 1, two well-aged permanent magnets 1 are connected to soft iron pole pieces 2 and 3 so that like magnet poles are connected to the same pole piece and provide an air gap of relatively large cross section between the pole pieces. A magnetic armature 4 of relatively small cross section is fixed in this air gap and bridges the pole pieces. Its ends may be supported directly upon the pole pieces, or by interposed pieces of non-magnetic material, so that the armature is immovable relative to the magnets and pole pieces. The armature is provided with two windings 5 and 6, one of which, 5, is a primary adapted to be energized either directly or indirectly from the source to be controlled. The other winding, 6, is a secondary adapted to be connected to a controlling device or circuit.

The magnets, pole pieces and armature are so proportioned that the magnetizing force in the air gap of large cross section is large compared to that required to saturate the armature, for instance fifty times as great, and so that the total flux across the said air gap is large compared to the flux in the saturated armature. Such proportioning prevents alternating currents in coils 5 and 6 from gradually demagnetizing the permanent magnets and also keeps the changes in said total flux relatively small even though the armature flux is changed or reversed. The magnets 1 should be made of steel having a high degree of permanency, such as the steel used for permanent magnets in electric meters. The armature 4 may be a rod or wire which preferably, should have very high permeability with a sharp bend in its magnetization curve at the point of saturation, and be saturable by a relatively small magnetizing force. Transformer steel is satisfactory and some alloys of nickel, iron and cobalt, or two of these metals, have the desired properties to a high degree, one such alloy having the trade name "Permalloy." The whole structure should be well aged to insure that the permanent magnetizing force between the pole pieces 2 and 3 will be unvarying to a high degree of accuracy throughout the useful life of the instrument.

The device shown in Fig. 1 constitutes an electrical standard of comparison and operates as follows. Normally the armature 4 is magnetically saturated, as stated, by a portion of the total flux between pole pieces 2 and 3. The voltage to be compared, or a voltage bearing a definite relation to a quantity to be compared, is impressed across the coil 5 but the resulting magnetomotive force does not change the flux in the armature unless it opposes the magnetomotive force of the magnets 1 and until it becomes almost equal to the latter in the space within the coil 5. If there is no change in flux in the armature no voltage will be induced in coil 6. However, if the difference between the opposing magnetomotive forces becomes less than the force required to saturate the armature, its flux will be reduced or reversed and a voltage will be induced in coil 6. If the armature 4 is made of good transformer steel or of a special alloy, as described above, a slight excess of magnetomotive force from the primary 5 will cause a sudden change in armature flux from saturation in one direction to saturation in the opposite direction, thereby inducing a relatively high voltage in the secondary 6. Such voltage may be detected or measured in any suitable manner. Thus the instrument of Fig. 1 indicates when a voltage or other quantity bears a desired relation to the constant magnetomotive force of magnets 1.

Figure 2:
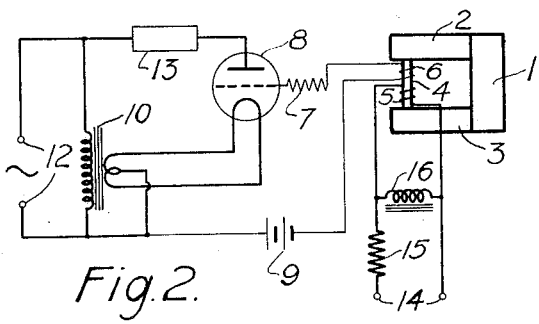
Fig. 2 is a circuit diagram of one application of the invention.

Fig. 2 illustrates how the voltage induced in secondary 6 may be utilized to regulate the source of the voltage applied to primary 5. Parts 1 to 6, inclusive, correspond to those of Fig. 1 except that a single permanent magnet is used in the standard. The winding 6 is connected in the grid circuit of a grid-controlled gaseous discharge tube 8, and in series with the usual grid resistor 7 and a source of bias potential 9. The latter is shown as a battery but may be an alternating current source if it is phased to prevent tube 8 from starting when there is no voltage across the winding 6. A transformer 10 supplies the cathode heating current for tube 8, the grid return being made to the midpoint of the transformer secondary. The primary of transformer 10 is connected to a suitable source of alternating current 12 which also supplies the discharge current for tube 8 through a load or output device 13. Terminals 14 should be connected to the source of voltage to be controlled (not shown). In some cases a resistance 15, preferably having a zero temperature coefficient, is inserted in the connection between one terminal 14 and the coil 5; also, an inductance 16 may be bridged across the coil if it is desired to adjust its voltage phase relative to source 12. The resistance 15 and inductance 16 are so chosen that the current flowing through coil 5 produces a magnetomotive force in armature 4 not quite equal to that of the permanent magnet 1 when the desired voltage is applied at 14. The source 12 may be obtained from the device to be controlled and should be synchronous with the source 14 if the latter is alternating.

The operation of the control circuit of Fig. 2 is as follows. The polarities of the connections are such that, when the voltage at 14 rises above the desired value and causes a voltage to be induced in winding 6 as described above, the induced impulse makes the grid of tube 8 less negative, or positive, when its anode is positive, thereby starting the discharge current through the tube and the load 13. The energy in the load circuit may be used in any suitable manner to cause a reduction of the voltage at 14, thus causing this voltage to be maintained at the desired value. If the phase of the voltage across coil 5 leads the voltage of source 12 by about 60 electrical degrees, the tube 8 will start early in its positive half-cycle and its full output will be obtained. Such phase relation may be obtained by proportioning resistance 15 and inductance 16, or a condenser may be substituted for resistance 15 and the inductance omitted.

Figure 3:
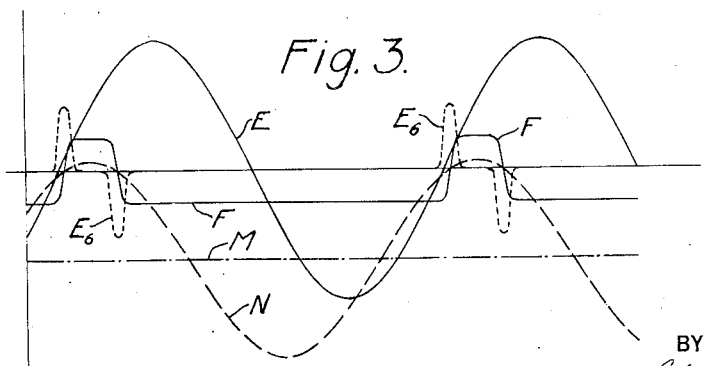
Fig. 3 shows curves representative of certain relations in Fig. 2.

The conditions existing in the circuit of Fig. 2 are indicated in Fig. 3 wherein the curve E represents the supply voltage 12, the half-cycles above the axis representing positive potentials on the plate of tube 8 relative to its cathode. M represents the constant magnetomotive force of the permanent magnet 1. The curve N represents the varying magnetomotive force due to the current in winding 5. Curve F represents, to an enlarged scale, the flux through armature 4 the straight horizontal portions indicating saturation thereof. Curve $E_6$ is the voltage generated in coil 6 by changes in flux F when the voltage at 14 is too high, that is, when the peak of curve N slightly exceeds the value of M as shown. It is the positive half of voltage $E_6$ that starts the discharge in tube 8 and thereby applies a corrective impulse to the device from which the voltage 14 is derived. The negative half of $E_6$ has no effect because the discharge in tube 8, once started, is not stopped by a negative grid potential until the anode voltage falls to zero.

The control circuit of Fig. 2 is of the all-on, all-off type and is adapted to buck down the controlled voltage when it tends to exceed the desired value.

Figure 4:
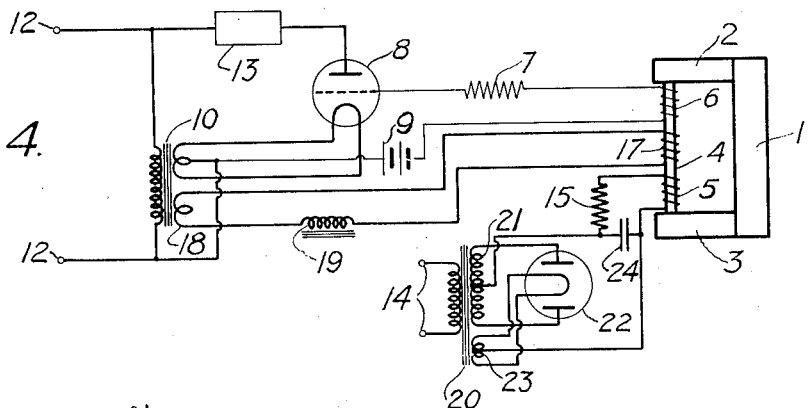
Fig. 4 is a circuit diagram of a modified form of the invention.

Fig. 4 shows a modification which provides a gradual increase in current through tube 8 as the voltage increases above normal. This is accomplished by an additional or tertiary winding 17 on armature 4, supplied with a small alternating current lagging the plate voltage of tube 8 by nearly 90°. Such current may be obtained from transformer 10 by means of a secondary winding 18 and series inductance 19. The voltage 14 to be regulated is rectified by connecting it across the primary of a transformer 20, a secondary winding 21 of which supplies plate current to a gaseous discharge tube 22. Another secondary winding 23 provides the cathode heating current for tube 22. The rectified output is obtained as usual from center taps on the secondary windings and may have a smoothing condenser 24 connected therebetween. A resistance 15 in series in one of the connections to coil 5, limits the rectified current flowing through the coil and maintains it substantially proportional to the voltage 14.

In the arrangement of Fig. 4 the magnetomotive force acting upon the armature 4 consists of that due to the permanent magnet 1, vectorially added to that from coil 5 proportional to the regulated voltage, and to an out-of-phase component from coil 17. No current flows in tube 8 until the voltage 14 increases to the point where the magnetomotive force of coil 5 plus that of coil 17 at its maximum value in the same direction, equals the magnetomotive force of the permanent magnet. Due to the phase shift in the current of coil 17 this occurs only in the latter part of a positive half cycle for tube 8. The flux in armature 4 then changes abruptly and generates a voltage in coil 6 which starts tube 8 in the latter part of the positive half cycle and passes a corrective current of short duration through the load 13. If the voltage 14 continues to increase the magnetomotive force of magnet 1 is equalled at an earlier point in the cycle, secondary voltage in 6 is generated earlier, a larger portion of the half cycle is passed through tube 8, and more current flows through load 13. If, despite this correction, voltage 14 increases to the extent that the magnetomotive force of coil 5 minus the maximum magnetomotive force of coil 17 equals that of the permanent magnet 1, the flux in armature 4 will reverse near the beginning of the positive half cycle and tube 8 will pass the full positive current wave. Preferably the alternating magnetomotive force of the winding 17 is made small compared to that of the permanent magnet, a ratio of 1:20 being satisfactory.

Thus a gradual increase of tube current is obtained as the voltage 14 increases somewhat over its normal value, thereby giving a smoother correction than that obtained from the circuit of Fig. 2. If desired the circuit of Fig. 4 may be adjusted so that the normal value of voltage 14 is obtained when tube 8 starts at an intermediate point in the positive half cycle of its plate potential and provides a partial bucking effect each cycle. In such case the regulation will be effective in either direction, that is, if voltage 14 tends to go above normal more current will be passed by tube 8 and thus buck the voltage down, whereas if the voltage tends to fall below normal less current will be passed by tube 8, thus reducing the bucking effect and allowing the voltage to regain its normal value.

Figure 5:
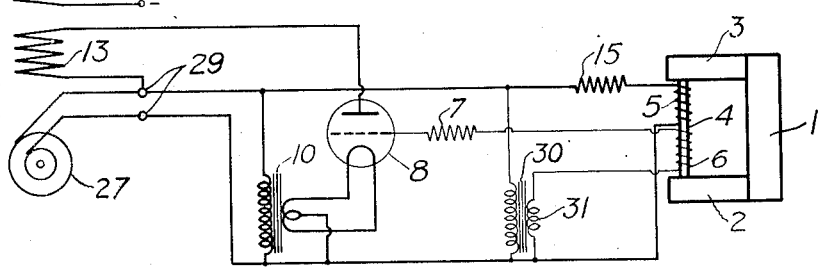
Fig. 5 is a circuit diagram of another embodiment constituting a voltage regulator for an alternating current generator.

Fig. 5 shows how an arrangement similar to Fig. 2 may be used as a voltage regulator for an alternating current generator 27. In this case the load 13 may be an auxiliary field which opposes the main field 28 of the generator. The main output terminals 29 provide the source of all potentials for the regulator and thus take the place of sources 12 and 14 of Fig. 2. A transformer 30 has its primary winding connected across terminals 29 and its secondary winding 31 connected in the grid circuit of tube 8 so as to bias the grid negatively when the anode is positive. Secondary 31 thus takes the place of battery 9 in Fig. 2.

Normally, field 28 is adjusted to give greater than normal voltage at terminals 29 when there is no load on the generator 27. The portion of this voltage which is impressed on coil 5 is sufficient to reverse the flux in armature 4, induce an impulse each cycle in coil 6, and thus cause a current to pass through tube 8 and field 13. This current reduces the resulting field of generator 27 and holds down the output voltage at 29 to its normal value. When a load current is drawn from the generator its voltage will tend to fall, whereby tube 8 will start less often and permit the resulting field to increase sufficiently to keep the voltage at 29 normal.

Modifications may be made to adapt the above described standard to speed control and similar applications, because any quantity which can be converted into a proportional electrical voltage or current may be used and compared to the unvarying standard magnetomotive force of the permanent magnet, and the difference used to generate voltage impulses which, in turn, may control a relatively large current or voltage by means of a trigger-type gaseous discharge tube.

An advantage of such a magnetic device over former arrangements is that it has a fixed value independent of frequency, ambient temperature, and ageing effects, the last at least to as high degree as the permanent magnet meters in present use.

I claim:

1. An electrical standard comprising a permanent magnet adapted to create a constant magnetomotive force across an air gap of large cross section, a magnetic armature of relatively small cross section disposed in said gap and saturated by said magnetomotive force, a winding on said armature adapted to create an opposing flux therein without materially affecting the total flux in the air gap of large cross section, and a second winding on said armature in which a voltage is induced only when the armature flux is reduced by the first winding.

2. In combination, a permanent magnet, a pair of pole pieces therefor providing an air gap of large cross section for the permanent magnet flux, an armature of relatively small cross section bridging said pole pieces and normally saturated by said magnet, means for creating a counter flux in said armature, and a winding responsive to flux changes in the armature.

3. In combination, a permanent magnet having a fixed air gap of large cross section between its poles, a normally saturated magnetic armature of relatively small cross section fixed in said gap, and means for creating a counter flux in said armature without demagnetizing the permanent magnet.

4. A standard of comparison comprising means for creating a permanent magnetomotive force, an armature magnetically saturated thereby, means for creating in said armature an opposing magnetomotive force which is responsive to a quantity to be compared, and means associated with said armature and adapted to indicate when the armature flux is reduced below saturation by said opposing magnetomotive force.

5. A regulator comprising means for creating a permanent magnetomotive force, an armature magnetically saturated thereby, means for creating in said armature an opposing magnetomotive force which is responsive to a quantity to be regulated, a winding on said armature, and means responsive to voltages induced in said winding for varying said quantity.

6. A control system for a grid controlled gaseous discharge tube, comprising a permanent magnet, a magnetic armature normally saturated thereby, a winding on said armature connected to a source of control voltage so as to oppose the flux in the saturated armature, a grid circuit for said tube which normally prevents starting thereof, and a second winding on said armature connected in said grid circuit so as to start the tube when the control voltage is sufficient to change the flux in the armature.

7. A control system for a grid controlled gaseous discharge tube, comprising a permanent magnet, a magnetic armature normally saturated thereby, and windings on said armature, one connected to control said tube and one responsive to a controlling force and adapted to reduce the armature flux below saturation.

8. A control system for a grid controlled gaseous discharge tube, comprising a permanent magnet, a magnetic armature normally saturated thereby, a winding on said armature connected to control said tube, and another winding responsive to a voltage to be controlled and adapted to induce an impulse in the first said winding when said voltage exceeds a value determined by the magnetomotive force of the magnet.

9. A control system comprising a normally saturated magnetic member, a primary winding thereon responsive to a controlling force and adapted to desaturate said member, and a secondary winding on said member adapted to control said force.

10. A control system comprising a source of voltage to be controlled, a grid controlled gaseous discharge tube having a load circuit capable of controlling said source, a grid circuit for said tube, a permanent magnet, a magnetic armature normally saturated thereby, a primary winding on said armature the current in which is responsive to said voltage, and a secondary winding on said armature connected in said grid circuit.

11. A control system as defined in claim 10 including a rectifier connected between said primary winding and the source of voltage to be controlled, and a tertiary winding on said armature connected to a source of alternating current phased to lead the voltage in said load circuit.

12. A control system for a grid controlled gaseous discharge tube comprising a source of alternating anode potential for said tube, a permanent magnet, a magnetic armature normally saturated thereby, a winding on said armature connected to control said tube, a source of alternating potential to be controlled, a rectifier connected thereto, a second winding energized by said rectifier and adapted to oppose the flux in said armature, and a third winding on the armature connected to a source of alternating current phased to lead the said anode potential by approximately 90°.

13. A voltage regulator for an alternating current generator comprising a normally saturated magnetic member, a grid controlled gaseous discharge tube connected to change the generator voltage, a coil on said magnetic member connected in the grid circuit of said tube and adapted to control the starting thereof, and means responsive to the generator voltage for changing the flux in said member.

14. A voltage regulator for an alternating current generator as defined in claim 13 wherein said generator comprises main and auxiliary field windings, the latter being connected in the anode circuit of said discharge tube so that the field flux produced by the auxiliary winding opposes the main field flux.

15. A voltage regulator for an alternating current generator as defined in claim 13 and means energized from the output of said generator for supplying the cathode heating current and grid bias, respectively, for said discharge tube.

16. A control system for a grid controlled gaseous discharge tube, comprising a permanent magnet, a magnetic armature normally saturated thereby, and three windings on said armature, the first winding connected to control said tube, the second responsive to a controlling force and adapted to reduce the armature flux below saturation, and the third adapted to modify the effect of the second winding.

DONALD V. EDWARDS.